United States Patent
Bouillet

(10) Patent No.: US 8,077,260 B2
(45) Date of Patent: Dec. 13, 2011

(54) CO-CHANNEL INTERFERENCE DETECTOR

(75) Inventor: Aaron Reel Bouillet, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1435 days.

(21) Appl. No.: 11/581,268

(22) Filed: Oct. 16, 2006

(65) Prior Publication Data

US 2008/0088736 A1    Apr. 17, 2008

(51) Int. Cl.
*H04N 5/21*    (2006.01)
(52) U.S. Cl. ........................................................ 348/607
(58) Field of Classification Search ................ 348/607, 348/609, 611, 614, 618, 625, 627; 375/346, 375/347, 350, 316; 455/63, 67.3
See application file for complete search history.

(56) References Cited

U.S. PATENT DOCUMENTS

| 5,325,204 | A  | * | 6/1994 | Scarpa | 348/607 |
| 5,400,084 | A  | * | 3/1995 | Scarpa | 348/624 |
| 5,748,226 | A  | * | 5/1998 | Limberg | 348/21 |
| 6,426,983 | B1 | * | 7/2002 | Rakib et al. | 375/346 |
| 7,324,616 | B2 | * | 1/2008 | Sobchak et al. | 375/346 |
| 2006/0092330 | A1 | * | 5/2006 | Markman et al. | 348/614 |
| 2006/0146200 | A1 | * | 7/2006 | Edde et al. | 348/725 |
| 2010/0020235 | A1 | * | 1/2010 | Bouillet | 348/500 |

* cited by examiner

*Primary Examiner* — Paulos Natnael
(74) *Attorney, Agent, or Firm* — Robert D. Shedd; Joseph J. Opalach

(57) ABSTRACT

A receiver processes a received signal for determining the presence of a co-channel interfering signal by (a) measuring a power level of a first signal in a first narrowband frequency region of a wideband frequency channel; (b) measuring power levels of signals in narrowband frequency regions adjacent to the first narrowband frequency region; and (c) determining if the first signal is an interfering signal in the wideband frequency channel as a function of the measured power levels.

19 Claims, 5 Drawing Sheets

CO-CHANNEL INTERFERENCE DETECTOR

CROSS-REFERENCE TO RELATED APPLICATIONS

This application is related to the copending, commonly assigned U.S. patent application Ser. No. 10/535,979, entitled "Apparatus and Method for Detecting NTSC Co-Channel Interference", filed Nov. 12, 2003; and Ser. No. 10/536,058, entitled "An NTSC Signal Detector", filed Nov. 12, 2003.

BACKGROUND OF THE INVENTION

The present invention generally relates to communications systems and, more particularly, to a receiver.

During the transition from analog to digital terrestrial television in the United States, both analog NTSC (National Television Systems Committee) based transmissions and digital ATSC-HDTV (Advanced Television Systems Committee-High Definition Television) based transmissions are expected to co-exist for a number of years. As such, an NTSC broadcast signal and an ATSC broadcast signal may share the same 6 MHz wide (millions of hertz) channel. This is illustrated in FIG. 1, which shows the relative spectral positions of the NTSC signal carriers (video, audio and chroma) with respect to the digital VSB (Vestigial Sideband) ATSC signal spectrum. Thus, an ATSC receiver must be able to efficiently detect and reject NTSC co-channel interference.

In an ATSC-HDTV digital receiver, NTSC co-channel interference rejection may be performed by the comb filter (e.g., see, United States Advanced Television Systems Committee, "ATSC Digital Television Standard", Document A/53, Sep. 16, 1995). The comb filter is a 12 symbol linear feed-forward filter with spectral nulls at or near the NTSC signal carriers, and is only applied when NTSC interference is detected (e.g., see, United States Advanced Television Systems Committee, "Guide to the Use of the ATSC Digital Television Standard", Document A/54, Oct. 4, 1995). Tests have shown that the comb filter performs efficient NTSC signal rejection for D/U (Desired-to-Undesired) signal power ratios up to 16 dB (decibels). The D/U signal power ratio is defined as the average digital VSB ATSC signal power divided by the peak NTSC signal power.

Since the comb filter is only applied when NTSC interference is detected, it is necessary to first detect the presence of NTSC co-channel interference. Further, it is desirable to be able to detect the NTSC co-channel interference in high D/U ratios. The above-mentioned "Guide to the Use of the ATSC Digital Television Standard," describes an implementation of an NTSC detector that uses the power difference between the input signal and the output signal of the comb filter. In particular, this implementation detects that an NTSC co-channel signal is present when there is a substantial difference in power between the input signal and the output signal of the comb filter. Unfortunately, this is a wideband measurement and, as such, is susceptible to other impairments in the desired signal band. In addition, this approach is not reliable for D/U ratios above 10 dB.

SUMMARY OF THE INVENTION

In accordance with the principles of the invention, a receiver processes a received signal for determining the presence of a co-channel interfering signal by (a) measuring a power level of a first signal in a first narrowband frequency region of a wideband frequency channel; (b) measuring power levels of signals in narrowband frequency regions adjacent to the first narrowband frequency region; and (c) determining if the first signal is an interfering signal in the wideband frequency channel as a function of the measured power levels.

In an illustrative embodiment of the invention, an ATSC receiver includes an equalizer having a programmable finite impulse response (FIR) filter and a power detector. The FIR is set to a first narrowband frequency region in which an NTSC video carrier may be present and the FIR provides a first filtered signal. The power detector then measures a power level of the first filtered signal. Then, the FIR is set to adjacent narrowband frequency regions and the power detector measures the power levels of these resulting filtered signals. Finally, the power detector determines if an NTSC co-channel interfering signal is present as function of the measured power levels.

In view of the above, and as will be apparent from reading the detailed description, other embodiments and features are also possible and fall within the principles of the invention.

DETAILED DESCRIPTION

Other than the inventive concept, the elements shown in the figures are well known and will not be described in detail. Also, familiarity with television broadcasting and receivers is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire), ATSC (Advanced Television Systems Committee) (ATSC) and VBI encoding is assumed. Likewise, other than the inventive concept, transmission concepts such as eight-level vestigial sideband (8-VSB), Quadrature Amplitude Modulation (QAM), and receiver components such as a radio-frequency (RF) front-end, or receiver section, such as a low noise block, tuners, and demodulators is assumed. Similarly, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

Figure 1:
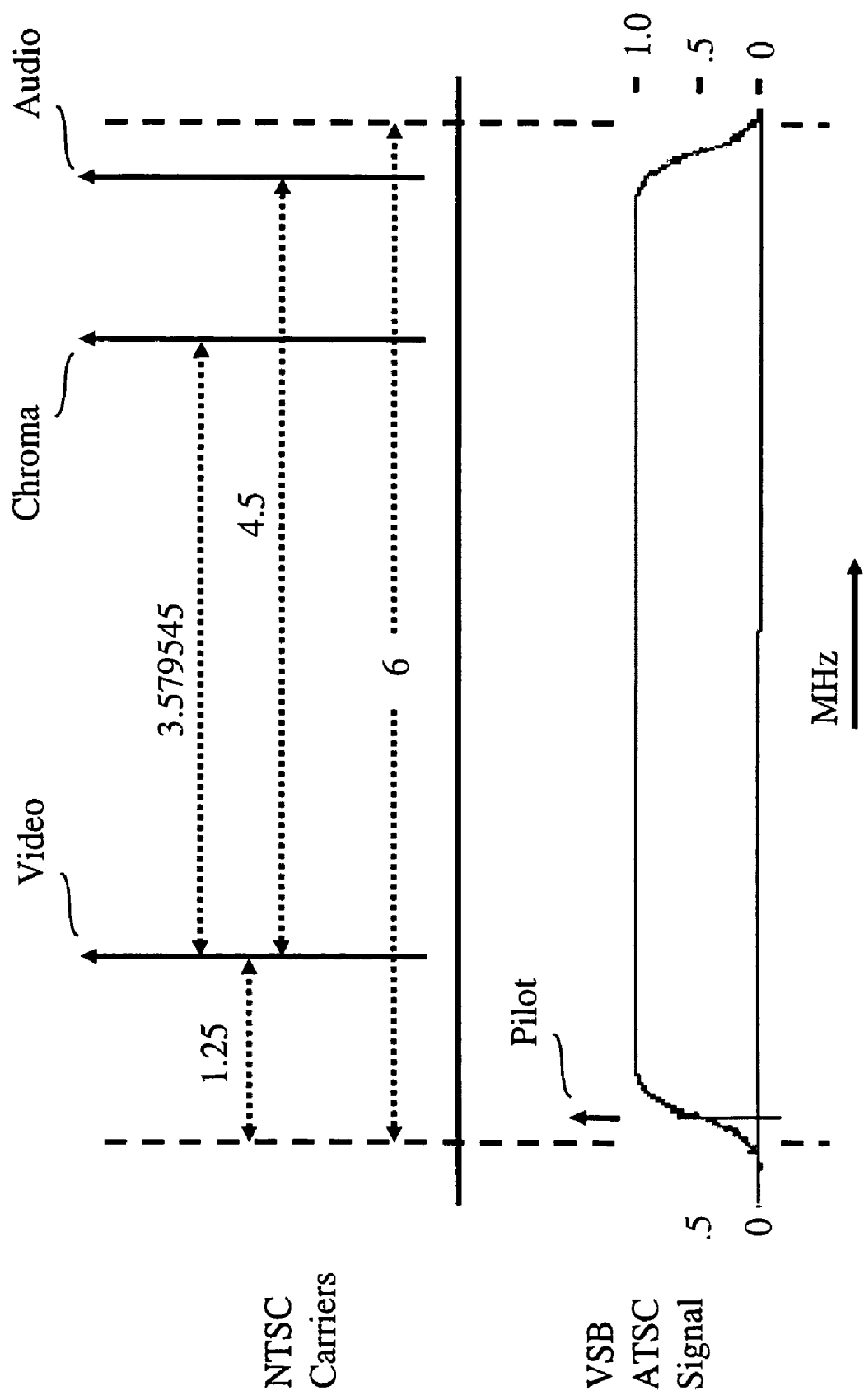
FIG. 1 shows a comparison of an NTSC signal spectrum and a ATSC signal spectrum.
Figure 2:
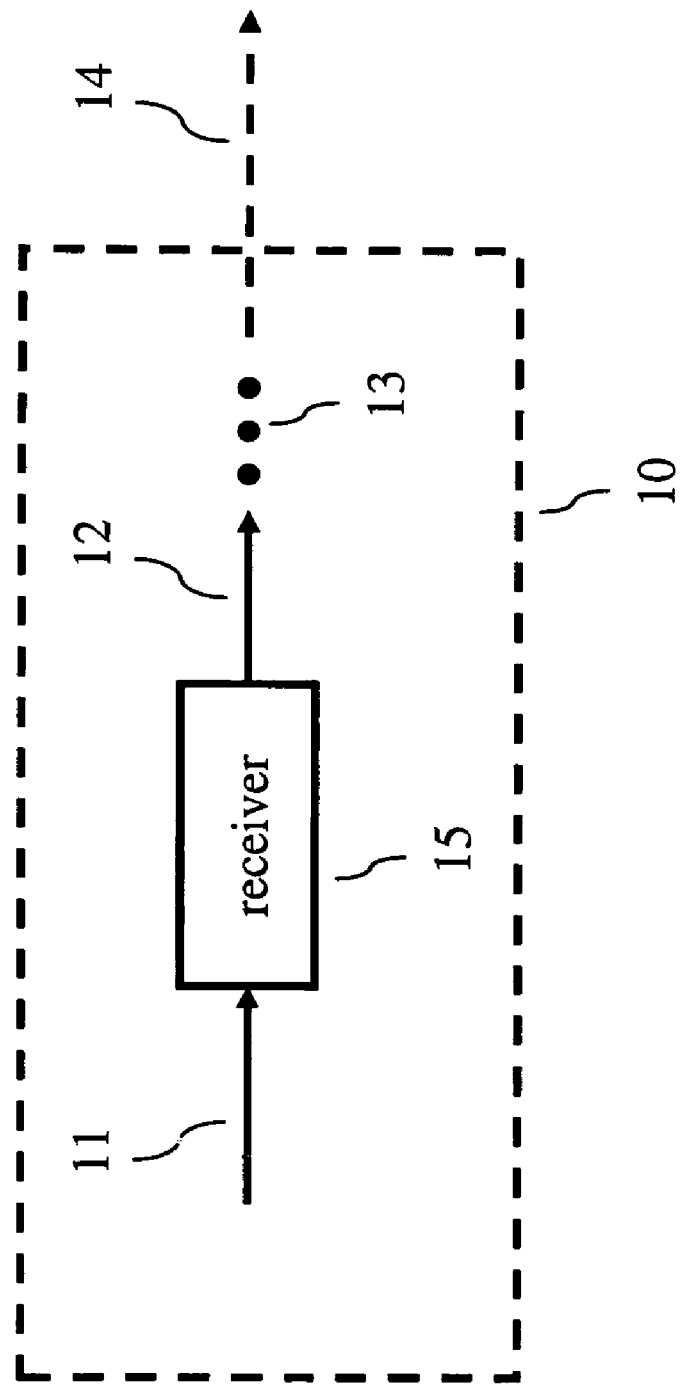
FIG. 2 shows an illustrative high-level block diagram of a receiver embodying the principles of the invention.

A high-level block diagram of an illustrative device 10 in accordance with the principles of the invention is shown in FIG. 2. Device 10 includes a receiver 15. As described below, receiver 15 functions in accordance with the principles of the invention for receiving a broadcast signal 11 and for providing an output video signal 12. Illustratively, device 10 may be a set-top box (cable, satellite, etc.), TV set, personal computer, mobile phone (e.g., with video output), etc. In this regard, the video output signal 12 may be further processed by device 10 (as represented by the ellipses 13) before being transmitted to another device, or provided to a display, as represented by dashed arrow 14. For example, in the context of a set-top box, dashed arrow 14 may represent a re-modulated video signal (e.g., at a frequency corresponding to channel 4); or, in the context of a flat-panel TV, dashed arrow 14 may represent a base band video signal before application to a display element (e.g., a flat-panel, cathode-ray-tube (CRT), etc.).

in this example, receiver 15 is an ATSC-compatible receiver. It should be noted that receiver 15 may also be NTSC-compatible, i.e., have an NTSC mode of operation and an ATSC mode of operation such that receiver 15 is capable of processing video content from an NTSC broadcast or an ATSC broadcast. In this regard, receiver 15 is an example of a multimedia receiver. However, in the context of this description, the ATSC mode of operation is described. Receiver 15 receives a broadcast signal 11 (e.g., via an antenna (not shown)) for processing to recover therefrom an output video signal 12, e.g., an HDTV signal for application to a display (not shown) for viewing video content thereon. As noted above, and shown in FIG. 1, broadcast signal 11 is a wideband signal and may include not only a broadcast ATSC signal but also interference from a co-channel broadcast NTSC signal. In this regard, receiver 15 of FIG. 2 includes a rejection filter (not shown), such as the above-mentioned comb filter, for removing the NTSC signal interference as described above and, in accordance with the principles of the invention, also includes an NTSC co-channel interference detector.

Figure 3:
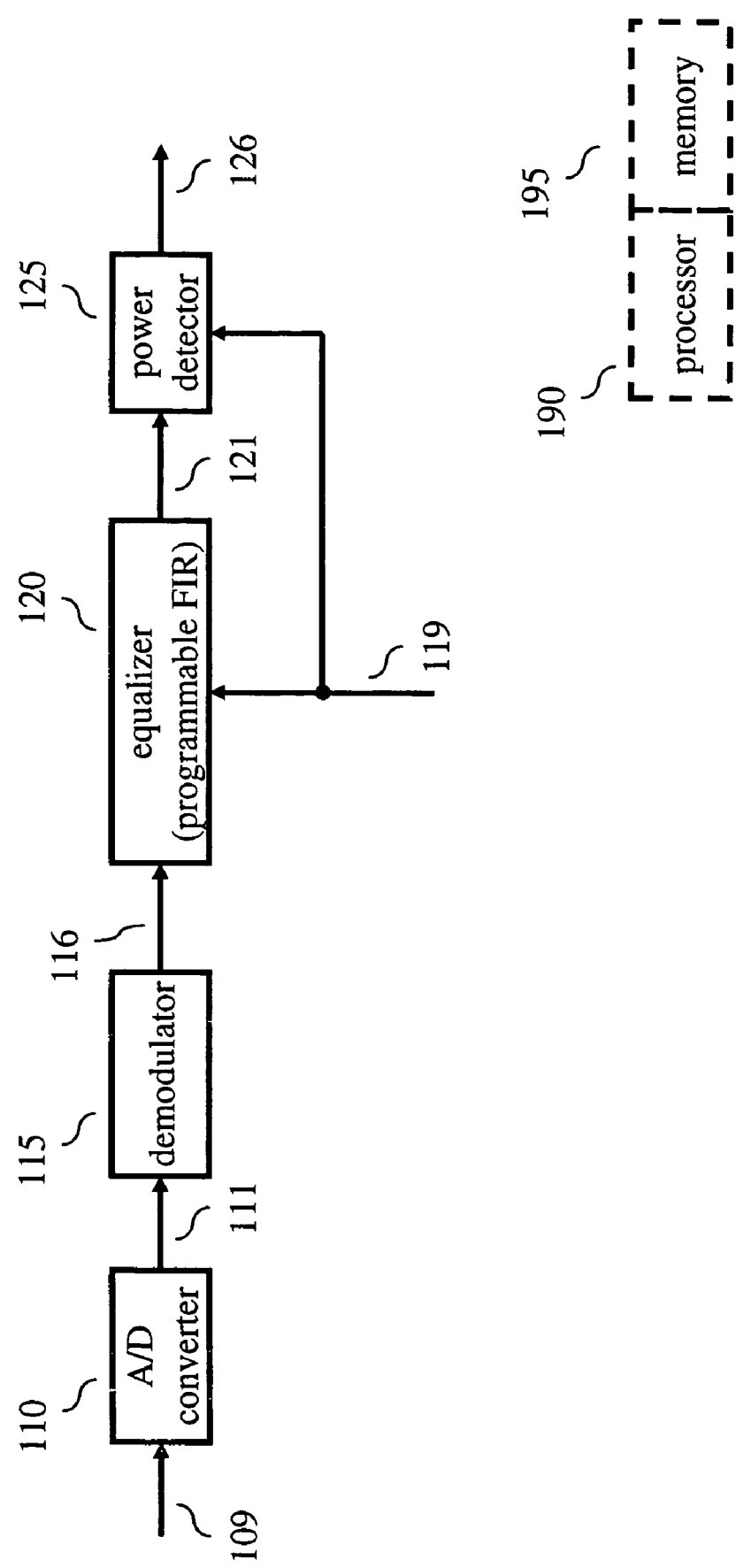
FIG. 3 shows an illustrative portion of a receiver embodying the principles of the invention.

Turning now to FIG. 3, that relevant portion of receiver 15 including an NTSC detector in accordance with the principles of the invention is shown. Receiver 15 is a processor-based system and includes one, or more, processors and associated memory (not shown) as represented in dashed line form by processor 190 and memory 195. In this context, the associated memory is used to store computer programs, or software, which is executed by processor 190, and to store data. Processor 190 is representative of one, or more, stored-program control processors and these do not have to be dedicated to the NTSC detection function, e.g., processor 190 may also control other functions of device 10. Continuing with the description of receiver 15, an RF front-end (not shown) provides a down-converted signal 109, which represents a digital VSB modulated signal in accordance with the above-mentioned "ATSC Digital Television Standard". However, and as noted above, an NTSC co-channel interferer may also be present. Down-converted signal 109 is provided to A/D converter 110, which samples the down converted signal 109 to convert the signal to the digital domain and provide a sequence of samples 111 to demodulator 115. The latter comprises automatic gain control (AGC), symbol timing recovery (STR), carrier tracking loop (CTL), and other functional blocks as known in the art for demodulating signal 111 to provide demodulated signal 116 to equalizer 120. The equalizer 120 includes a programmable finite impulse response (FIR) filter (not shown) for processing demodulated signal 116 in accordance with the principles of the invention. It should be noted that equalizer 120 is not adapting to the input signal. In particular, equalizer 120 is "frozen" and taps of the FIR section have been programmed to be a bandpass filter at some specific spectral location. It should also be noted that it is possible to implement an infinite impulse response (IIR) filter to achieve the same effective power response as a bandpass filter. In fact, since the phase properties of the output signal are irrelevant in this application, use of an IIR filter may lead to a simplified implementation. Equalizer 120 provides signal 121 to power detector 125, which processes signal 121 in accordance with the principles of the invention and provides a signal 126, which is representative of whether or not an NTSC co-channel interferer is present.

Figure 4:
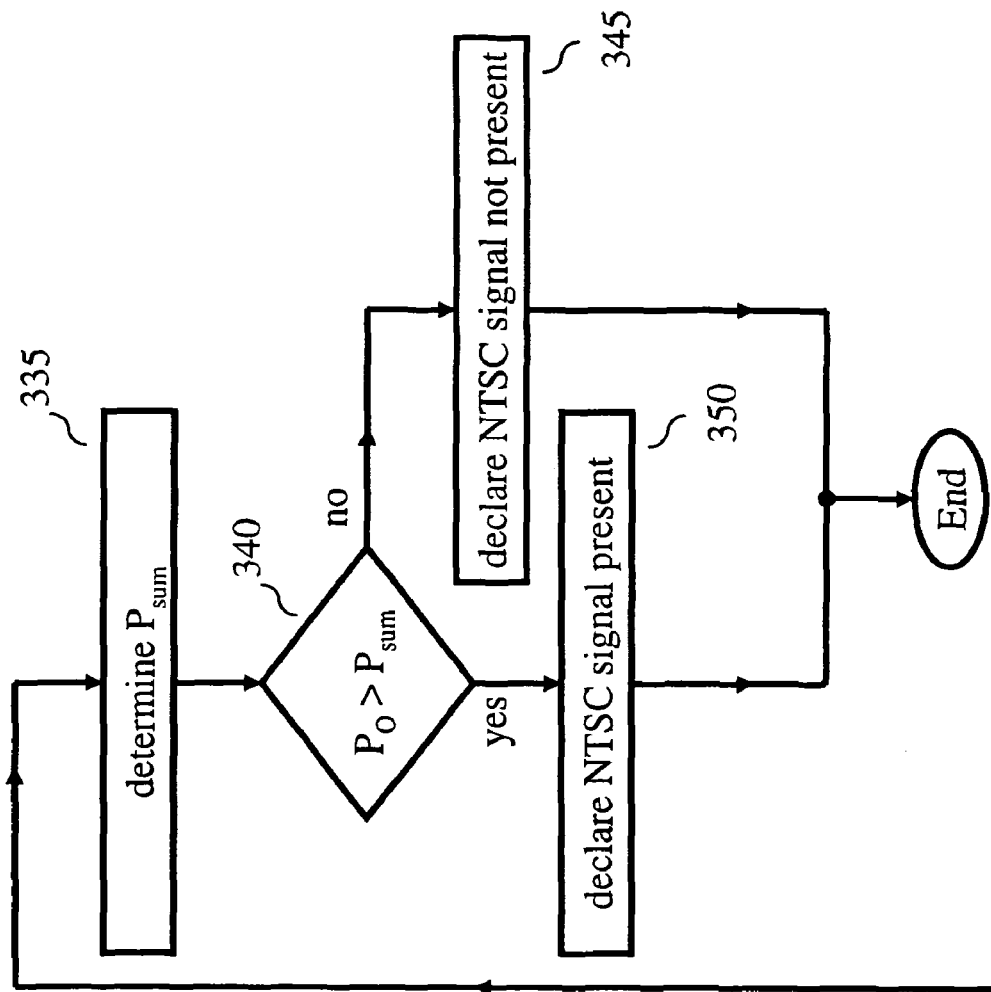
FIG. 4 shows an illustrative flow chart in accordance with the principles of the invention.
Figure 4:
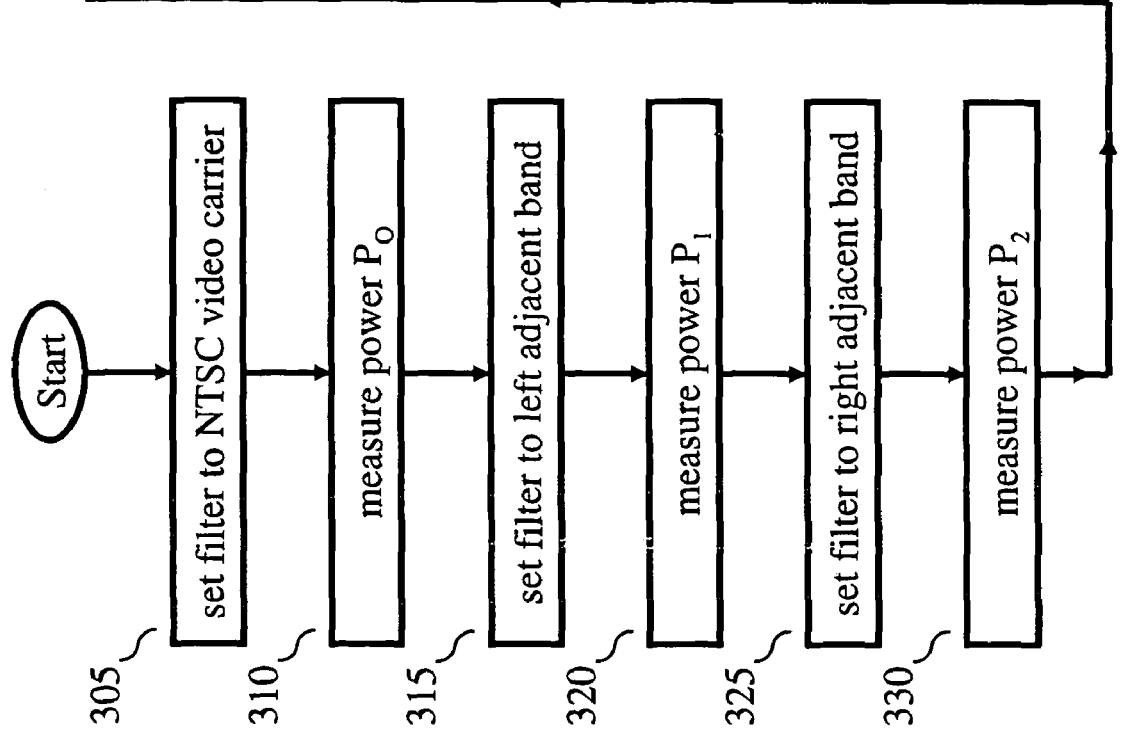
Figure 5:
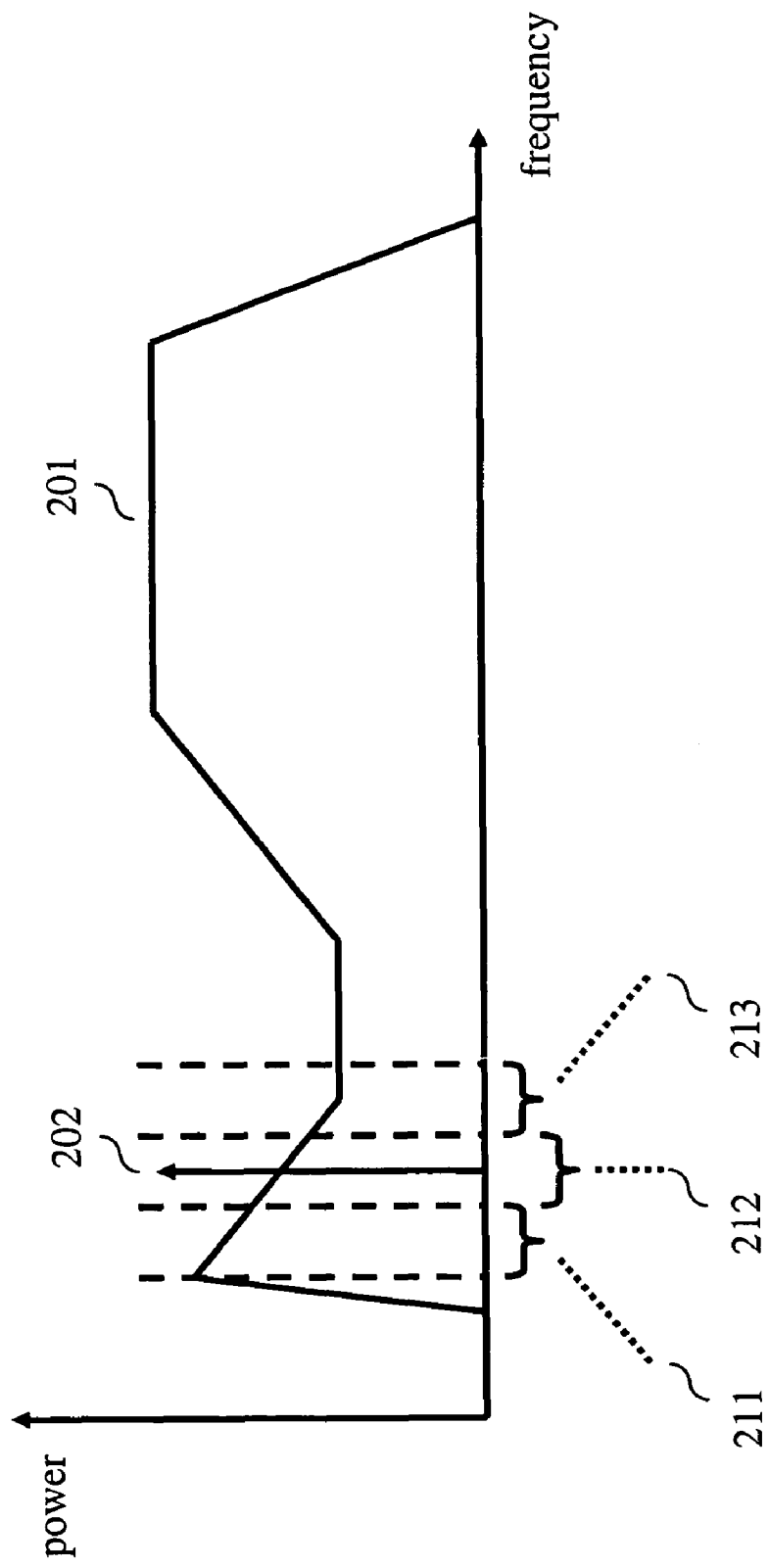
FIG. 5 shows a frequency spectrum illustrating the inventive concept.

Turning now to FIG. 4, an illustrative flow chart in accordance with the principles of the invention for use in receiver 15 is shown. At this point reference should also be made to FIG. 5, which illustrates operation of the inventive concept with respect to an illustrative frequency spectrum for a broadcast ATSC signal 201 and an NTSC co-channel interfering signal as represented by the presence of an NTSC video carrier 202. As can be observed from FIG. 7, three narrowband frequency regions are defined. The NTSC video carrier 202 is located within a narrowband frequency region 212. In accordance with the principles of the invention, two adjacent narrowband frequency regions, 211 and 213 are also defined. The narrowband frequency regions 211 and 213 are similar in bandwidth to that of narrowband frequency region 212. However, the inventive concept is not so limited. Returning to FIG. 4, in step 305, processor 190 sets, via control signal 119 (of FIG. 3), the programmable FIR of equalizer 120 to narrowband frequency region 212 for filtering demodulated signal 116. As noted above, narrowband frequency region 212 covers that portion of the frequency spectrum that would include an NTSC video carrier 202 (if present). In step 310, processor 190 controls, via control signal 119, power detector 125 for measuring a corresponding power level, $P_0$, of signal 121 when equalizer 120 is tuned to narrowband frequency region 212. Other than the inventive concept, this power measurement can be done as known in the art, e.g., either through dedicated multiply-and-accumulate hardware, or a microprocessor routine that reads stored filter output samples and performs the multiply accumulate through a software routine. After measuring the power level of signal 121 when equalizer 120 is tuned to narrowband frequency region 212, similar measurements are made for the adjacent narrowband frequency regions 211 and 213. In particular, in step 315, processor 190 sets, via control signal 119, the programmable FIR of equalizer 120 to adjacent narrowband frequency region 211 for filtering demodulated signal 116 in this narrowband frequency region and, in step 320, processor 190 controls, via control signal 119, power detector 125 for measuring a corresponding power level, $P_1$, of signal 121 when equalizer 120 is tuned to narrowband frequency region 211. Likewise, in step 325, processor 190 sets, via control signal 119, the programmable FIR of equalizer 120 to adjacent narrowband frequency region 213 for filtering demodulated signal 116 in this narrowband frequency region and, in step 330, processor 190 controls, via control signal 119, power detector 125 for measuring a corresponding power level, $P_2$, of signal 121 when equalizer 120 is tuned to narrowband frequency region 213.

After having measured the power levels of any signals in the three narrowband frequency regions, power detector 125 calculates a power parameter as a function of the measured powered levels, $P_1$ and $P_2$, in step 335. In this example, the following power parameter is determined:

$$P_{sum} = (P_1 + P_2)/2 \tag{1}$$

However, it should be noted that the inventive concept is not so limited and other equations could be used. For example, the measurement performed in equation (1) can be averaged to take into account any spectrum tilt due to multipath effects. Further, other linear or non-linear combinations may be used. Finally, in step 340, power detector 125 compares the measured power level $P_0$ to $P_{sum}$. If the measured power level $P_0$ is less than, or equal to, $P_{sum}$, then power detector 125 declares, via signal 126, that an NTSC signal is not present (step 345). However, if the measured power level $P_0$ is greater than $P_{sum}$, then power detector 125 declares, via signal 126, that an NTSC signal is present (step 350). It should be noted that other variations are possible. For example, power detector 125 may declare an NTSC signal is present only when $P_0$ is substantially greater than $P_{sum}$. Once it is determined whether an NTSC signal is present or not, receiver 15 returns to processing of broadcast signal 11 to recover therefrom output video signal 12. For example, if an NTSC co-channel interferer is present, the earlier-mentioned comb filter is used to remove the interfering NTSC signal.

Thus, and in accordance with the principles of the invention, the power detector described above performs three narrowband band measurements to determine if an NTSC co-channel interferer is present. As such, this narrowband approach is not susceptible to other impairments in the desired signal band and, in addition, is more reliable for D/U ratios above 10 dB.

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements may be implemented in a stored-program-controlled processor, e.g., a digital signal processor or microprocessor, which executes associated software, e.g., corresponding to one or more of the steps shown in FIG. 4. For example, the above-described power detector 125 may be representative of hardware, and/or one or more software subroutines that processes the received signal. Further, although shown as elements bundled within receiver 15, the elements of receiver 15 may be distributed in different units or devices. It is therefore to be understood that numerous modifications may be made to the illustrative embodiments and that other arrangements may be devised without departing from the spirit and scope of the present invention as defined by the appended claims.

The invention claimed is:

1. A method for use in a receiver, the method comprising:
    (a) measuring a power level of a first signal in a first narrowband frequency region of a wideband frequency channel;
    (b) measuring power levels of signals in narrowband frequency regions adjacent to the first narrowband frequency region; and
    (c) determining if the first signal is an interfering signal in the wideband frequency channel as a function of the measured power levels.

2. The method of claim 1, wherein each measuring step includes the steps of:
    setting a filter to a corresponding one of the narrowband frequency regions; and
    filtering a received wideband signal with the filter for providing a filtered signal; and
    measuring the power level of the filtered signal.

3. The method of claim 2, wherein the received wideband signal is an ATSC-HDTV (Advanced Television Systems Committee-High Definition Television) signal.

4. The method of claim 1, wherein the determining step determines if an NTSC (National Television Systems Committee) co-channel interfering signal is present.

5. The method of claim 1, wherein the first narrowband frequency region includes that portion of an NTSC frequency spectrum having a video carrier.

6. The method of claim 1, wherein the determining step includes the steps of:
    calculating a power parameter as a function of the measured power levels of step (b);
    comparing the power parameter to the power level of the first signal; and
    determining if the first signal is an interfering signal in the wideband frequency channel as a function of the comparison.

7. The method of claim 6, wherein the determining as a function of the comparison step determines an interfering signal is present when the power level of the first signal is greater than the power parameter.

8. The method of claim 6, where the power parameter is determined as a function of a linear combination of the power levels of the signals in the narrowband frequency regions adjacent to the first narrowband frequency region.

9. The method of claim 1, wherein bandwidths of the narrowband frequency regions are the same.

10. Apparatus comprising:
    an adjustable narrowband filter for filtering a received wideband signal in three narrowband frequency regions for providing three filtered narrowband signals, wherein one narrowband frequency region is adjacent to the other two narrowband frequency regions; and
    a power detector for measuring a power level of each of the three filtered narrowband signals and for determining if an interfering signal is present as a function of the measured power levels.

11. The apparatus of claim 10, wherein bandwidths of each narrow band frequency region are the same.

12. The apparatus of claim 10, wherein the adjustable narrowband filter is part of an equalizer.

13. The apparatus of claim 10, further comprising:
    a processor for adjusting the adjustable narrowband filter and for controlling the power detector to measure the power levels.

14. The apparatus of claim 10, wherein the received wideband signal is an ATSC-HDTV (Advanced Television Systems Committee-High Definition Television) signal.

15. The apparatus of claim 14, wherein the power detector determines if an NTSC (National Television Systems Committee) co-channel interfering signal is present.

16. The apparatus of claim 10, where the power detector (a) calculates a power parameter as a function of the measured power levels in the outer narrowband frequency regions, (b) compares the power parameter to the measured power level in the middle narrowband frequency region and (c) determines if an interfering signal is present in the received wideband signal as a function of the comparison.

17. The apparatus of claim 16, wherein the power detector determines an interfering signal is present when the measured power level in the middle narrowband frequency region is greater than the power parameter.

18. The apparatus of claim 16, where the power parameter is determined as a function of a linear combination of the power levels of the signals in the outer narrowband frequency regions.

19. The apparatus of claim 10, wherein the middle narrowband frequency region includes that portion of an NTSC frequency spectrum having a video carrier.

* * * * *